(12) United States Patent
Cafiero et al.

(10) Patent No.: US 6,762,675 B1
(45) Date of Patent: Jul. 13, 2004

(54) METHOD AND APPARATUS FOR REMOTE POWERING OF DEVICE CONNECTED TO NETWORK

(75) Inventors: Luca Cafiero, Palo Alto, CA (US); Maurilio De Nicolo, Saratoga, CA (US); Thomas Edsall, Cupertino, CA (US); Karl Nakamura, Palo Alto, CA (US); Soei-Shin Hang, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/406,248

(22) Filed: Sep. 27, 1999

(51) Int. Cl.$^7$ ............ H04Q 5/22; H04M 11/04; H04M 3/22; G06F 1/30
(52) U.S. Cl. ............ 340/10.42; 340/310.01; 379/22.01; 713/300; 713/310
(58) Field of Search ............ 340/10.42, 310.01, 340/825.52, 505, 524, 310.02, 310.06, 310.07, 568.1, 568.4, 571, 572.1, 568.2, 3.51, 333, 310.08, 310.03, 310.04, 310.05, 10.34, 425.2; 713/200, 300; 710/62, 8; 455/522; 379/22.01, 93.36

(56) References Cited

U.S. PATENT DOCUMENTS

| | | | | |
|---|---|---|---|---|
| 4,173,754 A | * | 11/1979 | Feiker | .......... 340/310.02 |
| 4,419,666 A | * | 12/1983 | Gurr et al. | .......... 307/39 |
| 4,703,306 A | * | 10/1987 | Barritt | .......... 340/310.08 |
| 5,544,163 A | * | 8/1996 | Madonna | .......... 370/352 |
| 5,668,857 A | * | 9/1997 | McHale | .......... 379/93.07 |
| 5,991,885 A | * | 11/1999 | Chang et al. | .......... 713/300 |
| 6,021,493 A | * | 2/2000 | Cromer et al. | .......... 340/505 |
| 6,218,930 B1 | * | 4/2001 | Katzenberg et al. | ... 340/310.01 |

OTHER PUBLICATIONS

Robert Bell, "P802.9f Draft Standard Local and Metropolitan Area Networks –Supplement to Integrated Services (IS) LAN Interface at the Medium Access Control (MAC) and Physical (PHY) Layers," *IEEE Standards Project*, 1997, pp. 1–24.

* cited by examiner

*Primary Examiner*—Brian Zimmerman
*Assistant Examiner*—Clara Yang
(74) *Attorney, Agent, or Firm*—Marger Johnson & McCollom, PC

(57) ABSTRACT

A network node determines the suitability of coupled devices for being remotely line powered before actually powering them. The node scan its ports to determine which ports are coupled to devices. The node then interrogates the coupled devices. A unique discovery tone or bit pattern is generated and sent to devices coupled to ports. The node then monitors the port for a return signal. If there is a return signal, it is compared to the transmitted discovery signal. The signal will be identical after allowing for line losses if the coupled device is suitable for remote line powering. If the comparison yields a match, the network node supplies remote line power to the device.

30 Claims, 4 Drawing Sheets

METHOD AND APPARATUS FOR REMOTE POWERING OF DEVICE CONNECTED TO NETWORK

BACKGROUND OF THE INVENTION

1. Field of the Invention

The present invention is related to the field of devices used in networks, and more specifically to network nodes that verify the power configuration of a device before supplying power to it.

2. Description of the Related Art

Integrated Services Local Area Networks (ISLANs) include nodes such as switches, gateways, routers, bridges, repeaters, etc. Network nodes are referred to generally below as network switches, but include any device used for processing information in a network. Endpoints connected to the network, such as Internet phones, can receive power along with data from the network switch. Such endpoints are called line powered devices.

An example of a line powered device is described with reference to FIG. 1. A network node, such as ISLAN Access Unit (AU) 12, is connected to two devices 14 and 16. Device 14 is a line powered telephone. Device 14 is connected to Port A of ISLAN AU 12 by a cable 14a. Switch 12 applies power remotely to device 14. Applied power is depicted by voltage $V_N$ traveling over cable 14a.

A serious problem exists when network switch 12 inadvertently applies power to a non-line powered device. In the example of FIG. 1, device 16 is unsuitable for remote line powering. Device 16 includes a network card 18 connected to Port B of ISLAN AU 12 by a cable 16a. Card 18 is not configured for receiving remote power from switch 12. If switch 12 applies power over cable 16a, the incoming waveform $V_N$ can damage card 18, as shown by a flash 18a.

In conventional circuit switched networks, telephones are often powered through the telephone lines. However, the telephones in packet switched networks may or may not be powered remotely by the network switch 12 over the network cable. In packet switched networks, the switch can detect a device coupled to a port (assuming the device already has power), but does not know whether the device is suitable for remote powering before power is applied to the device. What aggravates the problem is that such devices are often connected to the network switch at remote locations. For example, telephones are typically powered from a central location (e.g. a wiring closet) instead of locally (e.g. in the same office). This makes it hard to configure the network for different line powered devices.

The problem is worsened in the event of loss of power. In the case of telephones, users have come to expect service under all conditions, including loss of power. The device must therefore operate without interruption when local power is not available.

Accordingly, a need exists for identifying line powered devices on a packet switched network.

BRIEF SUMMARY OF THE INVENTION

The present invention ascertains the suitability for remote powering a device from a network switch, before the network switch supplies power to the device. The network switch determines suitability by interrogating all coupled devices.

The switch sends a discovery signal to the ports connected to remote devices and monitors each port for a return signal. If a return signal is received, it is compared to the transmitted discovery signal. If the signals are identical, accounting for the expected signal losses in the wire, the coupled device is deemed suitable for receiving power remotely from the network switch. Accordingly, the network switch then supplies power to the line powered devices. If the network switch fails to discover any device, the switch periodically retries this discovery signal in order to detect new devices that are connected. The network switch also monitors ports that have power applied, looking for loss of signal, indicating that a device has been detached. Power then needs to be removed before another device is connected.

The invention eliminates having to preprogram the network switch with the type of devices connected to each port. This reduces the amount of time required to initially program the switch, and also eliminates having to reprogram the switch every time a new device is connected. The invention also eliminates having to reprogram the switch after loss of power. The invention is particularly useful in network locations without local power, or with a central power distribution facility that uses an uninterrupted power supply.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT(S)

The present invention identifies which devices connected to a network switch are suitable for remote powering. The network switch prevents accidental destruction of devices by first interrogating the devices before applying remote power.

Figure 1:
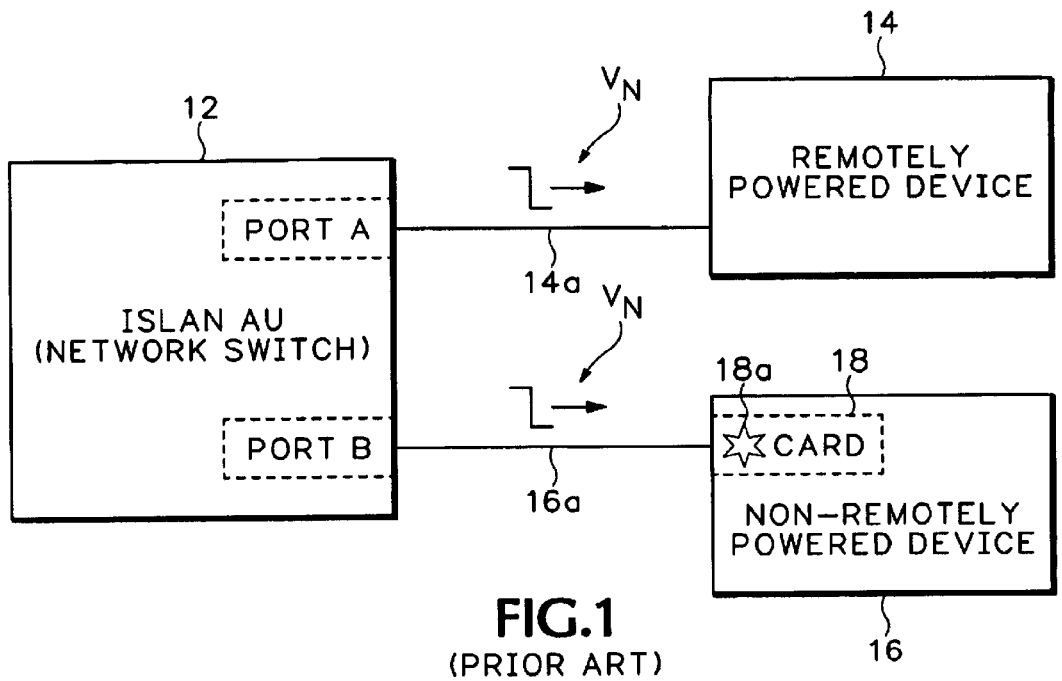
FIG. 1 is a block diagram of a prior art network switch connected to a first line powered device and a second non-line powered device.
Figure 2:
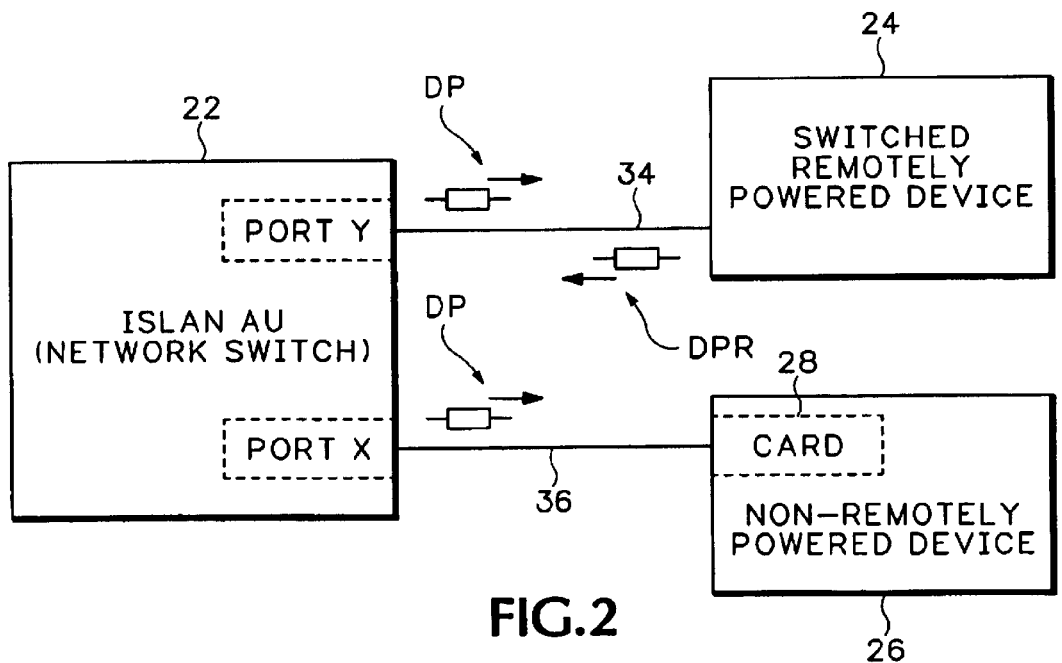
FIG. 2 is a block diagram of a network switch according to the invention interrogating connected devices before applying power to them.

Referring to FIG. 2, ISLAN AU 22 (network switch) has at least two ports, Port X and Port Y. These ports are typically 10/100Tx Ethernet ports with a physical interface (PHY). Switch 22 is connected to devices 24 and 26 by cables 34 and 36, respectively. Device 24 is a telephone, although the person skilled in the art will discern easily that it can be any remotely powered device. Device 26 is a non-line powered device and includes a network card 28. Cables 34 and 36 each include at least two pairs of data lines, at least some of which are used for sending and receiving data signals.

Switch 22 interrogates the device to determine its suitability for remote powering. Suitable devices (here only device 24, coupled to Port Y) are powered through their respective cables (here cable 34).

Figure 3:
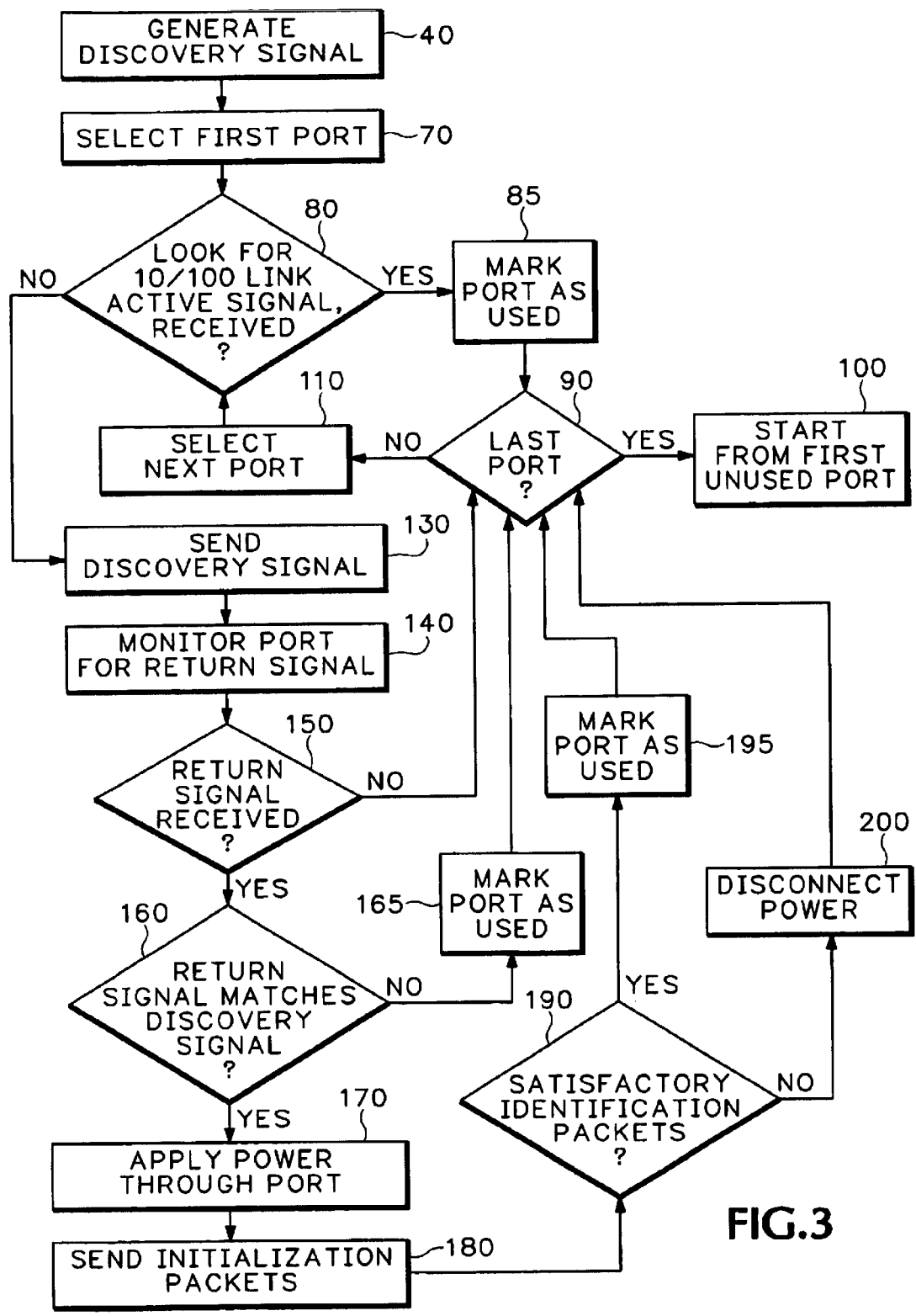
FIG. 3 is a flowchart showing how a network switch interrogates unused ports according to the invention.

Referring to FIGS. 2 and 3, switch 22 in step 40 generates a discovery signal. A variety of ways are possible for generating the discovery signal. According to the preferred embodiment, the discovery signal is typically a discovery tone sent over cable 34. The discovery tone is uniquely identified from other packets sent over the network. For example, the discovery tone can be chosen to be a "10101010 . . . " pattern, that is easily generated by digital logic.

As will be obvious to a person skilled in the art, any number of ways and sequences can be used to scan the ports to detect newly coupled devices that may need powering. For example, the ports can be scanned continuously, serially or in parallel, or scanned during switch idle times. The ports are generally scanned simultaneously at a low frequency such as 0.5 Hz to 1 Hz. Alternatively, the ports can be scanned sequentially, as described below.

Referring to step 70 in FIG. 3, a first port is selected. In step 80 the switch attempts to detect a 10/100 link active signal from a device connected to the port. If such a signal is detected, it is clear that the remote device is already powered and operational. That port is marked as used in step 85. If no link signal is detected, either there is no device or an unpowered device.

If the selected port was the last port in step 90, switch 22 returns to normal operations in step 100. If not, the next port is selected in step 110, and interrogated in step 80. This is repeated for all ports. Alternately, the switch performs other steps after each port is interrogated, before interrogating the next port. If the switch is already powering the connected device in step 110, or the link signal is detected without power, no further interrogation takes place, and execution proceeds to the next port.

If no link is detected in 80, the discovery tone is sent out through the port while keeping the power turned off. Referring briefly to FIG. 2, for Port X the discovery tone is transmitted over a line pair in cable 36. The transmission is at a rate, or the tone is constructed such that it reliably transverses twice the maximum cable length allowed for signaling. The discovery tone transverses cable 36 reaching device 26.

Referring back to FIGS. 2 and 3, a discovery tone is sent over a line pair in cable 36 X during process 130. Another line pair in cable 36 X is monitored for a return signal in step 140. The monitored line pair is the complement of the line pair over which the discovery tone was sent. If no return signal is received in step 150, the network switch 22 returns to step 90. There is no return signal if the far end of the cable 36 is not connected to a device. The network switch 22 then does not apply power out Port X.

In the example shown in FIG. 2, a device 26 is coupled to cable 36 but is not configured for receiving remote power over cable 36. The discovery tone is received by card 28 in device 26 at the end of cable 36. The interface card 28 does not recognize the discovery tone and, in turn, does not return the tone. However, device 26 may return a standard 10/100 link signal. The switch 22 waits a predetermined time period for a returned tone. If no discovery tone (referenced as DP tone) is returned within a specified period of time, the network switch 22 does not apply power to the device. Referring back to FIG. 3, execution then moves from step 150 to step 90, and the next port interrogated in step 80. If the switch returns a return signal, then processing proceeds to step 160.

Because the device 26 is not configured to receive line power, if device 26 returns a signal in step 150, the returned signal will be different than the discovery tone DP. In step 160, the returned signal is compared to the discovery signal DP. If there is no match, step 165 marks the port as used and execution moves to step 90. The next port is then interrogated in step 110.

The next port scanned in the example shown in FIG. 2 is Port Y. The process described above regarding Port X is repeated for Port Y. However, in the case of Port X, device 24 returns signal DPR. DPR is identical to DP, (except for line losses), as explained in more detail in connection with FIG. 4. Since there is a match at step 160, network switch 22 considers the device 24 a line powered device. Otherwise the port is marked as used (step 165).

Optionally once a remote line powered device has been so identified, the discovery tone is sent a few more times, and the return signal is accordingly recorded and confirmed. This reduces the probability of error.

According to step 170, switch 22 applies power through cable 34 to device 24. The power is applied as phantom power through the same pair of wires in cable 34 used for transmitting data, or through a pair of wires in cable 34 separate from the data lines.

After power is applied to device 24, the link is established between the switch and device. Then switch 22 sends one or more initialization packets in step 180. The initialization packets inquire the type, serial number, version, etc. of device 24. The device 24 sends back identification packets in response to the initialization packets. Data in the identification packets is processed by the network switch 22. If the data returned by device 24 is satisfactory in step 190, the port is marked as used in step 195 and execution continues for the next port. If not, then power may be disconnected in step 200, before continuing to the next port.

Figure 4:
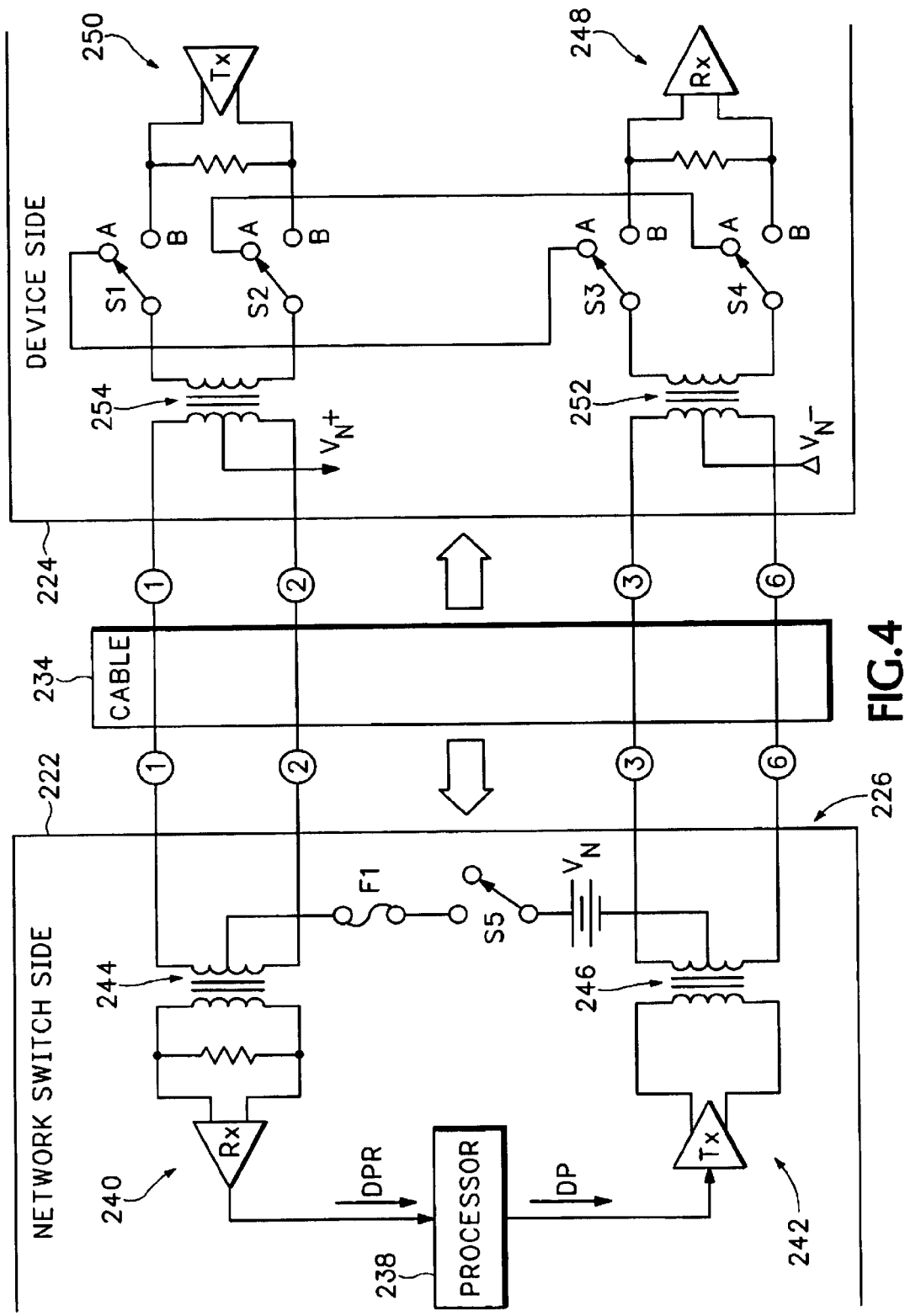
FIG. 4 is a circuit diagram of a network switch coupled to a telephone via a cable, wherein the network switch interrogates the telephone according to the present invention.

FIG. 4 shows an embodiment of the invention. An access unit 222 has a port 226 that connects through a cable 234 to terminal equipment 224, such as a telephone.

Unit 222 includes a processor and associated signal detection circuits 238, a receive (RX) filter 240, a transmit (TX) filter 242, transformers 244 and 246, a voltage source $V_N$ and optional series circuit protection such as fuse F1. The voltage can be switched on and off through a switch S5, and applied through taps in the middle of transformers 244 and 246. The fuse F1 has a high enough value so that it does not blow when a normal load is applied to port 226. The value of fuse F1 is low enough to ensure safety if the detection algorithm fails. One advantage of the invention is that it eliminates damage to ports that are not configured to receive power.

Telephone 224 includes a RX filter 248, a TX filter 250 and transformers 252 and 254. Device 224 further includes switches S1, S2, S3 and S4. These are interposed between transformers 252 and 254 and their respective RX and TX filters. This device is a line powered device. The switches S1–S4 are at a first position A or at a second position B. Switches S1–S4 are at position A before remote power is applied. The application of power throws switches S1–S4 to position B.

Cable 234 can be a Category 5 cable, having 8 lines that are organized in 4 line pairs. In this connection, pins 1 and 2 are differential transmitting signals TX+/−, and pins 3 and 6 are differential receiving signals RX+/−.

Returning to FIG. 4, processor 238 transmits discovery tone DP to transmit filter TX 242. The discovery tone DP passes through transformer 246, cable 234 (through lines 3, 6), and through transformer 252. When the device is unpowered, switches S1–S4 are in A position. The discovery tone DP passes through switches S3, S4 to switches S1, S2. The switches S1 and S2 relay the DP tone back through transformer 254 and through cable 234 (lines 1, 2). The DP tone is received by processor 238 as signal DPR.

The processor and detection circuits 238 compares DPR to DP. If they are the same, the processor 238 infers that the device 224 is suitable for remote line powering, and applies power by closing switch S5. The voltage $V_N$ applied on cable 234 causes switches S1–S4 to move into position B. Then data and superimposed power $V_N$ is carried over the same lines to RX 248 and TX 250.

After a link is established, it is important for the switch to interrogate used ports so that a device disconnection can be detected and the power removed from the port before another device can be reconnected. This detection of loss of link and removal of power should happen within 200–300 msec or less.

The isolation of the power supplied to the telephone 224 can be optimized according to relevant IEEE standards. More specifically, IEEE Draft Standard 802.9f (1997 version) specifies the details for providing power from an ISLAN Access Unit (AU) to an ISLAN-compliant Terminal Equipment (TE) via one of two methods: (a) PS1, powering over the signal pairs, and (b) PS2, powering over additional cabling. For both methods the AU 222 provides power with adequate isolation and protection from shorts and transients to protect other AU ports and other functions within the TE 224 or any associated equipment.

Figure 5:
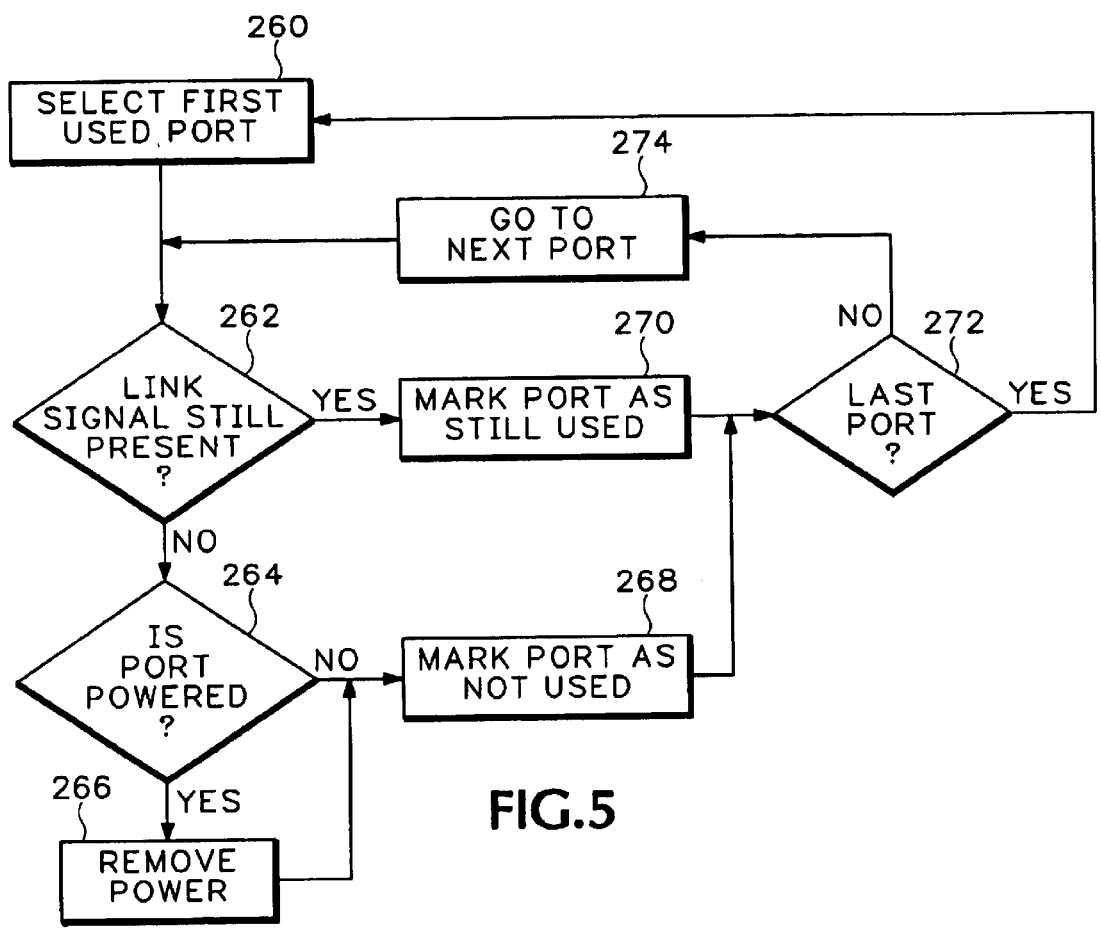
FIG. 5 is a flowchart showing how a network switch interrogates used ports to identify disconnected ports according to the invention.

FIG. 5 is a flowchart showing how a network switch interrogates used ports to identify disconnected ports. In step 260, the switch selects the first used port. If a link signal is still present on the port in decision step 262, the port is marked as used in step 270. If the link signal to that port is not still present in decision step 262, then at decision step 264 it is determined whether the port is powered. If the port is not powered, the port is marked as not used in step 268. If the port is powered, then power is removed at step 266 before marking the port as not used in step 268.

After the link is marked as still used in step 270, or after the port is marked as not used in step 268, then at decision step 272 it is determined whether the currently interrogated port is the last port. If not, then execution moves to step 274, where the next port is selected. Then execution returns to decision step 262, and repeats the steps described above. If the currently interrogated port is the last port in decision step 272, the network switch selects the first port in step 260, and repeats the steps described above.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Having illustrated and described the principles of the invention in a preferred embodiment thereof, it should be readily apparent to those skilled in the art that the invention can be modified in arrangement and detail without departing from such principles.

We claim all modifications coming within the spirit and scope of the accompanying claims.

The invention claimed is:

1. A method for remote line powering a network node comprising:

receiving a discovery signal at a network device;

relaying a return signal back to the network node corresponding to the discovery signal when the network device is configured for remote line powering and is not powered;

sending no corresponding return signal when the network device is not configured for remote line powering whether that device is powered or unpowered;

receiving remote power from the network node after sending the corresponding return signal; and automatically switching from a discovery signal loopback relay position to a remote line powering position when receiving remote power.

2. The method of claim 1 including receiving multiple discovery signal retries before receiving power from the network node if the return signal matches the discovery signal.

3. The method of claim 1 including receiving at least one initialization packet after receiving power from the network node.

4. The method of claim 3 including sending an identification packet responsive to the received initialization packet and receiving power from the network node responsive to data in the identification packet.

5. A network endpoint for connecting to a network cable comprising:

a receive input for connecting to the network cable;

a transmit output for connecting to the network cable; and a switching circuit having a first position relaying a discovery packet received on the receive input back out through the transmit output and automatically switching to a second position receiving data and remote power at the input and outputting data and providing a power return path at the output.

6. A network endpoint according to claim 5 wherein the switching circuit includes an output power interface outputting the remote power received at the receive input to a phone.

7. The network endpoint according to claim 6 including a transformer circuit coupled between the receive input and the output power interface.

8. The network endpoint according to claim 6 including a network device interface including a power connection and signaling connections.

9. The network endpoint according to claim 8 wherein the network device interface includes a differential pair of receive lines, a differential pair of transmit signals and power signals.

10. The network endpoint according to claim 5 wherein the switching circuit includes an interface outputting the data and the remote power to a phone.

11. An article comprising a machine-accessible medium having associated data that, when accessed, results in a machine determining suitability of providing remote power to a network device, the machine-accessible medium comprising:

code for generating a discovery signal before the network device receives power;

code for transmitting the discovery signal from the network node to the network device;

code for monitoring for a return signal from the network device;

code for comparing the return signal to the discovery signal if the return signal is received from the network device;

code for determining that the network device is suitable for remote powering when the return signal matches the discovery signal; and code for determining that the network device is unsuitable for remote powering when the return signal is not received or when the return signal, with the exception of line losses, does not match the discovery signal.

12. The article according to claim 11 wherein the code for determining that the network device is suitable for remote powering further comprises code for outputting a power signal from the network node for powering the network device when the network device loops back the discovery signal.

13. The article of claim 11 wherein the code for determining suitability of providing remote power to a network device further comprises code for waiting for the network node to become idle before transmitting the discovery signal.

14. The article of claim 11 wherein the code for determining suitability of providing remote power to a network device further comprises:

code for interrogating a first port on the network node for a connection to a first network device;

code for transmitting the discovery signal and monitoring for the matching return signal on the first port when the first network device is connected to the first port;

code for interrogating a second port on the network node for a connection to a second network device;

code for transmitting the discovery signal and monitoring for the matching return signal on the second port when the second network device is connected to the second port;

code for powering the first network device remotely with the network node when the matching return signal is detected on the first port;

code for powering the second network device remotely with the network node when the matching return signal is detected on the second port; and code for detecting disconnected devices and unpowering the port before another device is attached.

15. A circuit, comprising:

a first interface;

a second interface; and a switching circuit having a first state for receiving a remote power discovery signal on the first interface and sending a reply signal out through the second interface and automatically switching to a second state for receiving data and remote power at the first interface and outputting data and providing a power return path at the second interface.

16. A circuit according to claim 15 wherein the first interface includes receive terminals and the second interface includes transmit terminals.

17. The circuit according to claim 15 wherein the switching circuit includes a first switch and a second switch configured in the first switching circuit state to couple a first receive terminal on the first interface to a first transmit terminal on the second interface and configured in the second switching circuit state to couple the first receive terminal on the first interface and the first transmit terminal on the second interface to phone interface terminals.

18. The circuit according to claim 17 wherein the switching circuit includes a third switch and a fourth switch configured in the first switching circuit state to couple a second receive terminal on the first interface to a second transmit terminal on the second interface and configured in the second switching circuit state to couple the second receive terminal on the first interface and the second transmit terminal on the second interface to phone interface terminals.

19. The circuit according to claim 15 including a power circuit coupled between the first and second interface and the switching circuit.

20. The circuit according to claim 19 including taps on the power circuit for supplying power to an Internet phone.

21. The circuit according to claim 19 wherein the power circuit includes a first transformer coupled between the first interface and the switching circuit and a second transformer coupled between the second interface and the switching circuit.

22. The circuit according to claim 15 wherein the switching circuit automatically switches from the first state to the second state when power is received across the first and second interface.

23. The circuit according to claim 15 wherein the first interface includes a differential pair of receive signal contacts and the second interface includes a differential pair of transmit signal contacts.

24. The circuit according to claim 15 wherein the switching circuit when in a non-powered condition receives the discovery signal at the first interface and passes the discovery signal to the second interface.

25. A device, comprising a circuit configured to loop back signals on a network interface to indicate a remote power capability and further configured to change from looping back signals to connecting signals on the network interface to an endpoint interface when remote power is detected at the network interface.

26. The device according to claim 25 including an output power interface for connecting to power received at the network interface.

27. The device according to claim 26 including a transformer circuit coupled between the network interface and the output power interface.

28. The device according to claim 25 wherein the endpoint interface is configured to connect to a Voice over Internet Protocol (VoIP) phone.

29. The device according to claim 25 wherein the circuit loop backs signals when no power is applied to the circuit.

30. The device according to claim 25 wherein the network interface includes a differential pair of receive contacts and a differential pair of transmit contacts.

* * * * *